United States Patent [19]

English et al.

[11] 4,446,158

[45] May 1, 1984

[54] APPARATUS FOR MAKING INDIVIDUAL BEVERAGE QUANTITIES

[76] Inventors: Philip H. English, 425-41 Hill Dr., Aurora, Ohio 44202; Anthony D. Szpak, 6215 Jamestown Dr., Parma, Ohio 44134

[21] Appl. No.: 386,284

[22] Filed: Jun. 8, 1982

[51] Int. Cl.³ .................... A47J 31/02; B65B 29/02
[52] U.S. Cl. .................................. 426/79; 99/295; 99/304; 99/306; 426/77
[58] Field of Search ................... 426/77–84; 99/295, 304, 306; 206/0.5

[56] References Cited

U.S. PATENT DOCUMENTS

| | | |
|---|---|---|
| 1,499,281 | 6/1924 | Altieri . |
| 1,601,987 | 10/1926 | Topper . |
| 1,876,474 | 9/1932 | Starkey . |
| 2,716,607 | 8/1955 | Waline .................................. 426/79 |
| 2,743,664 | 5/1956 | Dale . |
| 2,885,290 | 5/1959 | Krasker . |
| 2,899,310 | 8/1959 | Dale ..................................... 99/295 |
| 3,083,101 | 3/1963 | Noury .................................. 99/295 |
| 3,345,935 | 10/1967 | Waline ................................. 426/79 |
| 3,373,677 | 3/1968 | Petrozzo .............................. 426/77 |
| 3,389,650 | 6/1968 | Michielsen .......................... 426/433 |
| 3,411,431 | 11/1968 | Moerlini .............................. 99/304 |
| 3,420,675 | 1/1969 | Costas ................................. 426/77 |
| 3,607,299 | 9/1971 | Bolt ..................................... 426/77 |
| 3,640,727 | 2/1972 | Heusinkveld ........................ 426/77 |
| 3,692,536 | 9/1972 | Fant ..................................... 426/77 |
| 3,811,373 | 5/1974 | Telco ................................... 426/77 |
| 3,822,013 | 7/1974 | Vander Veken ..................... 99/295 |
| 3,823,656 | 7/1974 | Vander Veken ..................... 99/295 |
| 3,846,569 | 11/1974 | Kaplan ................................. 426/77 |
| 3,937,134 | 2/1976 | Molenaar et al. ................... 426/77 |
| 3,971,305 | 7/1976 | Daswick .............................. 426/77 |
| 3,983,797 | 10/1976 | Wurm .................................. 99/306 |
| 4,119,019 | 10/1978 | Reid .................................... 99/306 |
| 4,158,329 | 6/1979 | McKnight ........................... 426/80 |

FOREIGN PATENT DOCUMENTS

| | | |
|---|---|---|
| 2151636 | 5/1972 | Fed. Rep. of Germany ........ 99/295 |
| 1080222 | 6/1953 | France . |
| 1289610 | 2/1961 | France . |
| 1347892 | 11/1962 | France . |

*Primary Examiner*—Steven L. Weinstein
*Attorney, Agent, or Firm*—Oldham, Oldham, Hudak, Weber & Sand Co.

[57] ABSTRACT

A disposable, individual coffee container and filter unit including a flat frame having an apertured center section, filter layers covering the top and bottom of the frame and being secured thereto, and individual quantities of coffee received in compartments formed in the frame between the spider-like center sections thereof. Additionally, a coffee brewing receptacle having an apertured base and a retainer flange in the base thereof for engaging the coffee carrying flat frame is provided.

13 Claims, 4 Drawing Figures

APPARATUS FOR MAKING INDIVIDUAL BEVERAGE QUANTITIES

TECHNICAL FIELD

This invention relates to coffee and beverage making apparatus, and particularly to prepackaged quantities of coffee carried in a disposable filter frame wafer or unit adapted for making small quantities, such as one cup, of coffee at a time. A retainer cup or other holder member for positioning the coffee filter wafer operatively may comprise another part of the invention.

BACKGROUND ART

Heretofore, there have been many different types of apparatus and methods proposed for making coffee and wherein such apparatus or methods have purportedly facilitated the efficient production of excellent tasting coffee. Many of such prior efforts have involved the use of specified quantities of coffee and placed the coffee in retainers through which hot water is poured to provide the desired beverage.

A number of problems have arisen in using the prior structures, including the fact that the strength of the coffee obtained is not uniform, the coffee may take an undesirable length of time for its production, the coffee grounds provided have not been used efficiently, the apparatus may have been costly to make and use, or the system may have been objectionable for other reasons.

DISCLOSURE OF INVENTION

The general object of the invention is to provide a new improved package for use in making individual quantities of beverages, especially coffee and to form them of a repetitive, constant quality or strength.

Another object of the invention is to package individual quantities of coffee in a novel container which is inexpensive, which is adapted to be used once and discarded, and which is a clean, easily handled, readily used container for brewing predetermined, individual volumes of coffee, specifically one cup at a time.

Another object of the invention is to regulate the flow of water through a coffee containing filter unit whereby the coffee is efficiently used but yet the flow of water through the coffee containing unit is not retarded and does not take an undesirable length of time.

Still another object of the invention is to provide coffee making apparatus which is convenient to use and which can be used in association with containers of varying diameters with minimal difficulty or adjustment; to facilitate the production of small, individually brewed quantities of coffee of repetitive high quality: and to use a coffee carrying filter unit which readily will fit into a holding cup in sealed relation therewith for receipt of hot water for flow down through the coffee filter unit.

Another object of the invention is to provide a rigid frame having filter sheets on the top and bottom thereof and having individual quantities of coffee held in separate compartments provided in the rigid frame, which is made of minimal height.

Another object of the invention is to provide a coffee carrying disc or wafer including a spider-weblike support therein and with quantities of desirable particle size coffee retained within the container in different compartments thereof by top and bottom sheets on the wafer.

Yet another object of the invention is to minimize the channeling of water when flowing hot water through a coffee carrying member for coffee production.

Another object of the invention is to use finely ground coffee particles or even coffee powder in a coffee making process to obtain rapid production of quality, high strength coffee by use of reduced amounts of coffee.

A further object of the invention is to obtain increased extraction of coffee from coffee particles positioned in a disposable spider-weblike wafer and to control the rate of flow of water through the coffee carrying wafer.

Other objects of the invention are to provide a unitary quantity of packaged coffee in a disposable wafer-like carrier designed to fit into a receptacle in sealed relationship therewith, and which can be readily positioned in a receptacle; to substantially fill a plurality of compartments in a coffee carrying unit with finely ground coffee particles; to avoid the swelling of coffee particles during the coffee brewing action; to provide a repetitive type of a coffee making unit adapted for making small quantities of coffee such as a single cup of coffee by use of uniform operating conditions; and to provide multiple cavities in a coffee carrying wafer to prevent the coffee from shifting laterally in the wafer and obtain a more uniform water flow through the individual cavities of the wafer.

These and other objects of the invention will become more apparent as the specification proceeds are achieved by: a disposable individual beverage forming container and filter unit, comprising: a flat frame having an apertured center section; filter layers covering the top and bottom of said frame and being secured thereto: said center section including a plurality of portions defining a plurality of separate areas in said frame; and individual quantities of beverage forming material received in said areas.

BRIEF DESCRIPTION OF DRAWINGS

Reference now is made to the accompanying drawings, wherein.

When referring to corresponding members shown in the drawings and referred to in the specification, corresponding numerals are used to facilitate comparison therebetween.

BEST MODE FOR CARRYING OUT THE INVENTION

A disposable individual coffee container and filter unit comprising a flat annular frame having a spider-weblike center section, filter layers secured to the top and bottom surfaces of the frame and covering the same, a plurality of separate areas being defined within the frame by ribs of the center section, and individual quantities of coffee received in and substantially filling the aforementioned areas. The invention also relates to use of the disposable coffee container and filter unit with a receptacle having a base with an apertured center portion which includes a dependent, substantially frusto-conically shaped flange and which is formed complementary to the periphery of said coffee container and filter unit for receipt of the same in such flange whereby hot water can be poured into the receptacle and flow through the coffee container and filter unit for beverage production.

Figure 2:
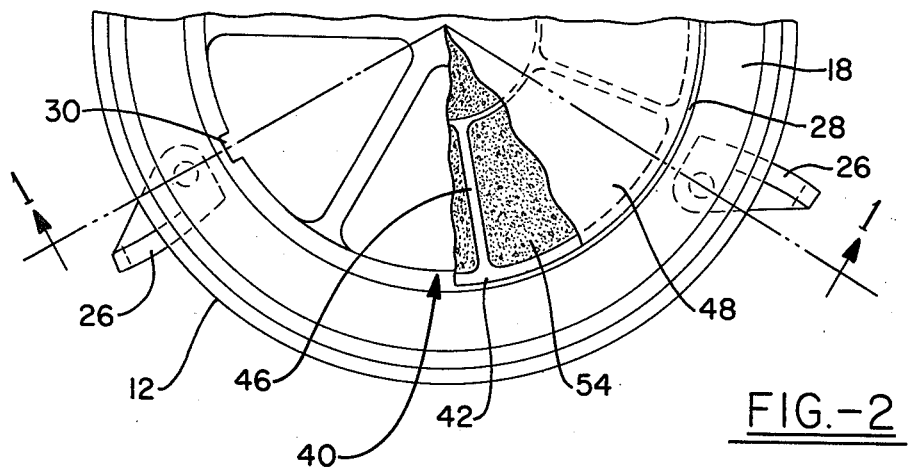
FIG. 2 is an enlarged fragmentary plan view of the apparatus of FIG. 1 with part of the filter unit broken away and the coffee receiving cup omitted.
Figure 1:
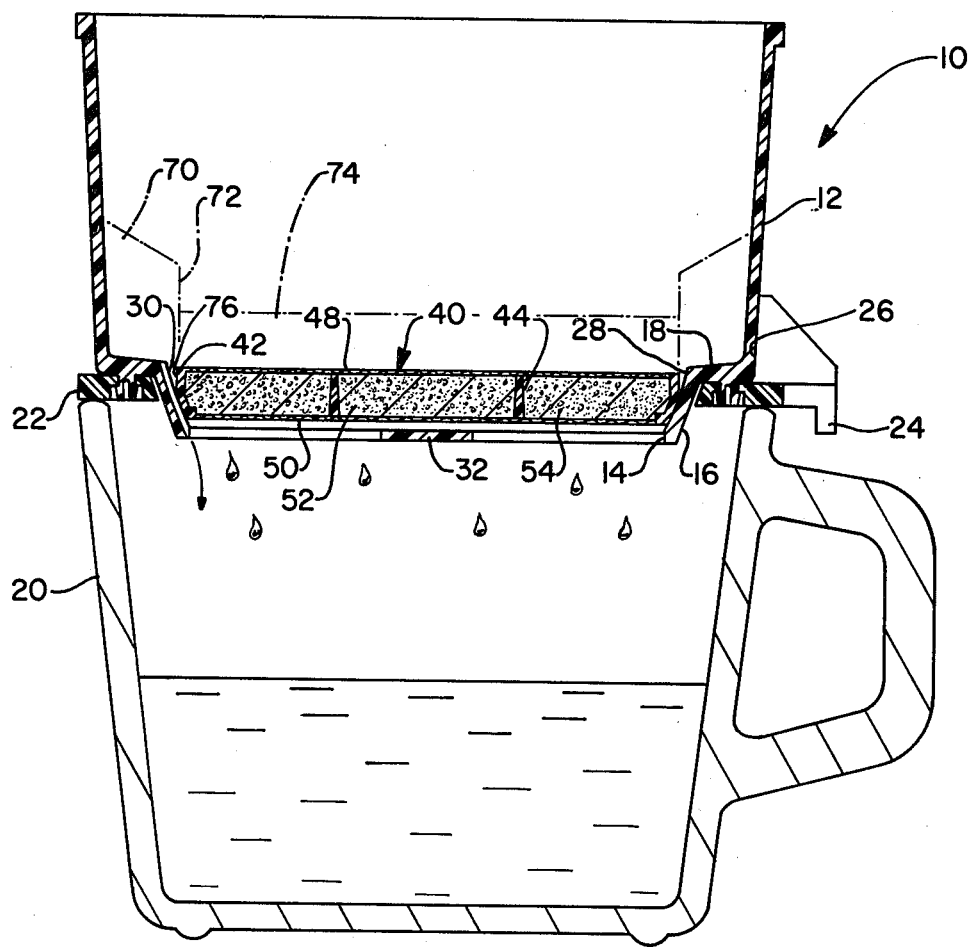
FIG. 1 is a fragmentary vertical section taken on line 1—1 of FIG. 2, through a coffee container and filter unit embodying the principles of the invention operatively positioned in association with a hot water receiving receptacle carried by a coffee receiving cup.

Attention now is particularly directed to the details of the construction shown in the accompanying drawings and FIG. 1 best shows the individual volume coffee or beverage maker of the invention. Specifically coffee making apparatus indicated as a whole by the numeral 10 is shown and this apparatus includes a receptacle 12 that has an apertured center 14 usually including a substantially frusto-spherically shaped flange 16 which connects the aperture 14 to a base 18 of the receptacle. This receptacle 12 is adapted to be carried by any type of a cup or other receptacle 20 provided to receive the beverage to be produced.

It is a feature of the invention that the receptacle 12 can be adapted to engage with any of a variety of sizes or diameters of cups or other containers for the desired beverages, and to facilitate this positioning for the receptacle 12, it is provided with a plurality of pivotally positioned tabs, lugs or brackets 22 that engage with a bottom surface of the base 18 which is flat at its periphery. These lugs or tabs 22 have a dependent outer flange 24 and a vertically upstanding shoulder 26 whereby the lug can be swung radially outwardly to extend the flange 24 out to a maximum diameter for engaging the lip of the beverage receiving cup 20. The lugs rotate to facilitate reducing the size of the receptacle 12 to allow its insertion into a typical automatic coffee brewer grounds basket for receipt of a disposable coffee and filter unit of the invention. In this use, the automatic brew device (such as a "Mr. Coffee") is used solely to provide a hot water source. Then the brewed coffee would pass into a standard carafe or serving cup placed below the brewing basket. This feature permits the conversion of a standard automatic brewer which is typically not used for brewing one cup of coffee into an efficient one cup automatic brewer.

The receptacle 12 has an apertured center 14 of a suitable type for engaging the coffee carrier wafer as hereinafter described. Such center is shown as comprising a spider-like open frame 32. The purpose of frame 32 is to align the carrier wafer in an approximate horizontal position to help insure proper engagement of the sealing surfaces.

As previously indicated, the aperture 14 has this frusto-spherical flange 16 formed thereon and hence a spherical surface 28 is provided on the inside of the flange for a reason to be described hereinafter in more detail. It is another important feature of the invention that at one small peripheral area of this spherical surface 28 a vertically extending recess or slot 30 is formed in such spherical surface to recess the same and provide a by-pass opening in the receptacle for flow of liquid through such recess when coffee or beverages are being made by pouring liquid through the coffee carrier unit positioned in the receptacle 12. Such by-pass slot 30 provides an added control for the rate of water flow through or by the coffee carrier unit.

FIG. 1 shows the beverage making process and thus, a disposable, individual coffee container and filter unit 40 is shown in removable engagement with this spherical surface 28 formed at the bottom of the receptacle 12. This unit 40 is made from a flat, annular frame 42 that has a spider-web like center section 44. The frame 42 can be made from any suitable material and preferably is made by molding it from a suitable plastic material, and the center section 44 includes a plurality of ribs or legs 46 that divide the center portion of the frame 42 into a plurality of compartments.

This disposable, individual coffee container and filter unit has a pair of filter layers 48 and 50 suitably secured to the top and bottom surfaces of this frame 42. The filter layers usually comprise filter paper and they may be heat sealed, for example, to the plastic frame 42 or be otherwise secured to the frame.

So as to make the unit 40 of the invention operative, initially only one of the filter layers 48 or 50 is positioned on the frame 42 and after that a quantity of coffee particles 52 are placed within the individual compartments 54 formed between the adjacent legs 46 and a peripheral portion of the frame 42. These compartments 54 extend the height of the frame and normally are loosely filled with coffee particles that relatively fully pack the compartments 54. Naturally after the compartments are filled with the coffee particles, then the other filter layer is suitably fixed to the remaining open side of the compartment to enclose the coffee particles.

It is important in practicing the present invention that, for best operative properties, the coffee bean be ground to at least "fine" particle size prior to being positioned within the unit 40. Such "fine" coffee particles could be those really considered to be ultra-fine ground coffee in the nomenclature of coffee grinding machines in use commercially at the present time. The coffee particles are, in effect, ground down to almost powder size but in all events comprise a really ultra-fine coffee particle grind. The reason why we find it extremely desirable to use this ultra-fine coffee particle size in practice of the present invention, is that we wish to avoid the coffee particles swelling during the coffee making action and conventionally ground coffee particles swell in the coffee making process, normally, and our ultra-fine ground coffee particles swell markedly less than standard drip grind particles or possibly not at all. Accordingly, the particles can substantially if not almost completely, fill the compartments 54 in the units 40 and yet will not give any trouble to water flow through the unit 40 by swelling up in the compartments and subsequently reducing the water flow rate.

We also have found that the use of ultra-fine ground coffee facilitates extraction of the coffee from the coffee particles and obtains a beverage of desired strength by use of minimum amounts of coffee. Yet a further important factor in use of a substantially filled compartment 54 and use of an ultra-fine ground coffee is that water poured onto the unit 40 will relatively rapidly pass through the filter, especially when we combine our by-pass recess 30 with the unit. By varying the size of this by-pass recess, we can facilitate flow of water through the unit 40 and out of the receptacle 12.

We have found that we can brew one cup of coffee in less than two minutes with excellent extraction by use of the individual coffee container and filter unit 40 that is designed with a minimal height and maximized diameter to reduce resistance to fluid flow; by utilizing an ultra-fine grind of coffee and, in addition, by providing a means for some of the water to by-pass unit 40 during the brew cycle. It is however recognized that the by-pass is not necessary for achievement of a good brew in a reasonably short period of time. The by-pass simply provides a means to control and minimize brew time in a manner that is independent of the flow resistances through unit 40. The use of substantially larger coffee particle sizes, such as standard drip grind, results in a brew time that normally is in excess of three minutes for good extraction. Test results furthermore indicate that our coffee making apparatus results in increased yield of approximately 25% from the grounds used (compared by color) to a brew from a standard "Mr. Coffee" automatic drip coffee maker when our one cup brew is compared to a six cup brew from the "Mr. Coffee".

We also find that we can make quality beverages i.e., coffee of repetitive strengths by use of the disposable unit 40 and one portion of our unit 40 that facilitates such action is the individual compartments 54 provided within the frame 42 and no or limited "channeling" of hot water flowing through the unit can occur. The coffee particles are retained in substantially uniform layer form for uniform resistance to water flow through the unit 40 in the different compartments 54 of the invention minimizing shifting of the coffee particles therein during use, transit and/or storage of the unit.

After all of the water has flowed through the disposable units 40 into the cup 20, naturally the receptacle 12 can be lifted off of the cup and then the unit 40, which normally is just dropped into position to engage the flange 16, can be removed by just inverting the receptacle 12. The receptacle 12 can be washed and stored for another use. The individual disposable coffee container units 40 of the invention can be stacked on top of each other and they are of minimum vertical height whereby they can be packaged and sold in relatively compact small units.

Obviously the disposable units 40 can be made of any suitable size but we particularly contemplate making just individual coffee cup or size units to permit repetitive high quality coffee to be obtained by a single person or group requiring only one or two cups of coffee at one time. Obviously, if desired, the disposable units 40 could be made larger in diameter and/or slightly thicker in vertical dimension, as desired. However, the quantities of coffee received therein would be doubled or quadrupled, etc., depending on the number of cups of coffee to be made by the filter units.

These larger individual filter and coffee container units may be ideally suited to restaurant use where perhaps 10 to 12 cups of coffee would be brewed with each unit. Also, two of the units 40 can be stacked on top of each other in the receptacle 12 and additional water poured through the units to make two cups of coffee. To position the upper unit 74 circumferentially spaced ribs 70 can be formed on the receptacle 12, FIG. 1, to engage the upper units by vertical shoulders 72. However, we particularly find our disposable units 40 to be especially desirable in making just single cups of coffee at one time, as set forth hereinabove.

Figure 4:
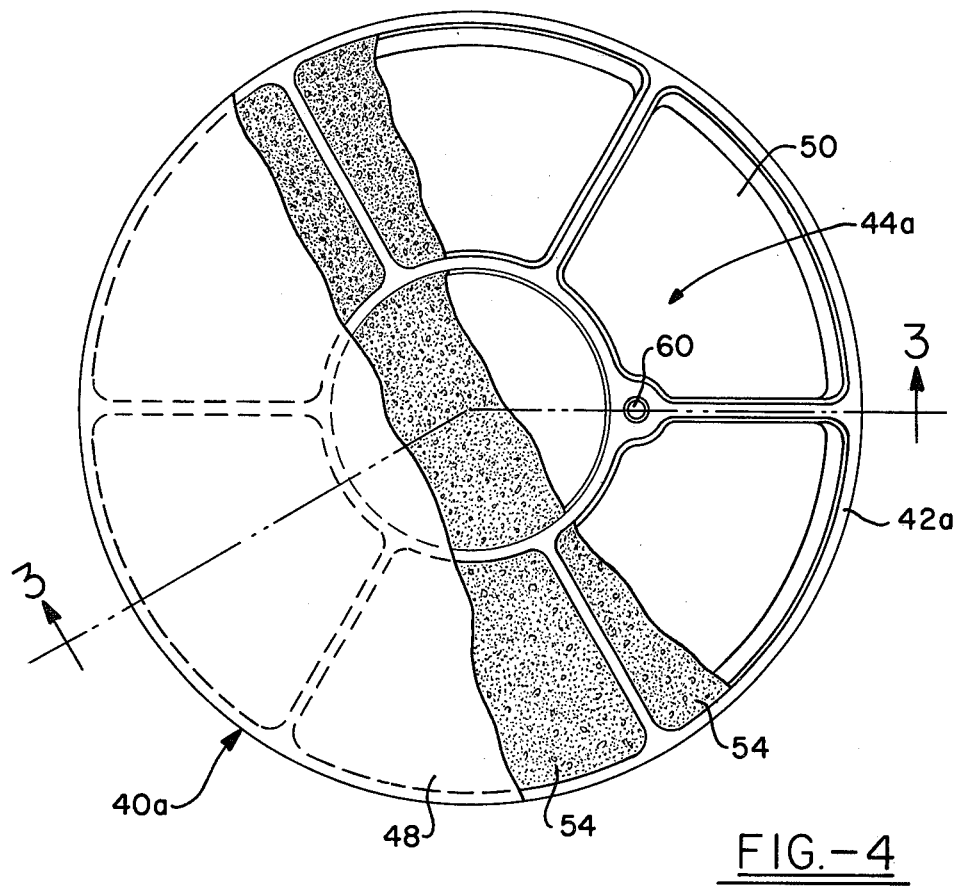
FIG. 4 is a plan view of a modified coffee container and filter unit of the invention.
Figure 3:
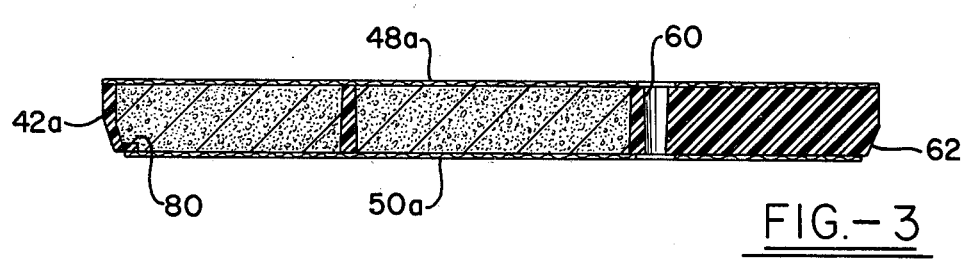
FIG. 3 is a vertical section taken on line 3—3 of FIG. 4.

FIGS. 3 and 4 show details of a modified disposable coffee container and filter unit 40a. This unit 40a has a frame 42a with an apertured open center section 44a like the filter unit 40. The unit 40a has a by-pass hole 60 formed in it and extending from top to bottom of the unit. Hence, no by-pass recess would be required in the coffee making receptacle with which it is to be used, or the by-pass opening could also be in the peripheral base area 18 of the receptacle as desired.

This filter unit 40a is generally the same as the unit 40 and has a lower corner portion 62. Such corner portion 62 is shaped and sized complementary to a base flange like the flange 16 of the receptacle 12. Such corner portion normally is frustospherical in vertical section for seating on and sealing against such base flange in the manner previously described.

The word coffee is used herein primarily to refer to the beverage produced by flowing hot or boiling water through coffee bean particles. Coffee particles or powder referred to herein means coffee bean particles or powder. Fine particles of the coffee bean as used herein, for example, are taken to be particles that can pass through mesh openings $\frac{1}{2}$ mm by $\frac{1}{2}$ mm and many particles may even be appreciably smaller than the $\frac{1}{4}$ mm$^2$ size. Such particles may vary in size quite a bit but are much smaller than typical standard drip grind coffee bean particles, many of which are in the range of 1.0 mm×1.0 mm to 1$\frac{1}{2}$ mm and 1$\frac{1}{2}$ mm.

Normally, a six ounce cup of coffee is to be made by the apparatus.

Obviously the size of the by-pass recess 30 or hole 60 can be changed to control the time of the coffee making cycle. By use, for example, of a by-pass hole of a diameter of about 0.077 inch, excellent coffee was obtained with filter units as those described by brew times of from about 90 to 120 seconds. The filter unit was 2$\frac{5}{8}$ inch in diameter and 3/16 inch thick.

It will be seen that the disposable beverage providing container and filter units of the invention can be positioned in any suitable carrier receptacle or basket for controlled flow of hot water through the filter units 40 or 40a. The hot water may be provided by a known type supplier such as a "Mr. Coffee" and the hot beverage filtrate produced can be collected in any suitable manner by a receptacle spaced from the filter unit. The filter units wuld be in sealed engagement, as described hereinbefore, for controlled flow of hot water through the filter unit. The filter units may be positioned in a slide basket prepared for use in a hot water heater such as a "Mr. Coffee" or the like, to replace positioning the filter units in the receptacle 12.

The frame 42 of the filter unit has a vertically extending upper edge 76 on its periphery and the shoulder 72 frictionally engages such edge to retain the second filter unit 74 in place when two cups of beverage are to be made at one time.

It will be noted that the filter units should seal against the support surface of a support or carrier receptacle for best coffee making action so that the surfaces 62 and 28 are of complementary, frusto-spherical shape. As a modification, the carrier receptacle may have two horizontally aligned filter unit receiving openings therein for multi-cup brewing action. Obviously any quantity of hot water can be supplied to the receptacle 12 or to any other receptacle used to position the filter units of the invention but such hot water quantity will naturally be coordinated with the amount of coffee provided by the filter unit means.

FIG. 3 best shows the plastic frame of the beverage container and filter units of the invention and the filter sheets or layers thereon. Filter frame 42a has an inwardly extending horizontal flange 80 at its lower edge. Note that the filter sheet 50a terminates radially inwardly from the frame edge as the sheet can be pre-cut to size and just be suitably secured to the frame to avoid any interference with the sealing surface of the corner portion 62. The filter sheet 48a may extend to the edge of the frame and it can be presized or be cut to size after attachment to the frame. Any sheet edge will not interfere with the seal of the frame unit when operative as the sheet 48a is above the sealing surface of the frame 42a.

From the foregoing, it is submitted that a disposable, individual coffee container and filter unit fulfilling the objects of the invention has been provided and that an improved beverage making apparatus has been developed. It is possible to put other soluble materials into the individual units 40, as desired, for making tea or other beverages, but the invention is especially directed towards the production of small one cup or larger quantities of repetitive quality and strength coffee. Hence, the objects of the invention have been achieved.

While one complete embodiment of the invention has been disclosed herein, it will be appreciated that modification of this particular embodiment of the invention may be resorted to without departing from the scope of the invention.

What is claimed is:

1. A disposable individual beverage forming container and filter unit, comprising:
   a uniform height impervious frame having an apertured center section and having a top and bottom;
   filter layers covering the top and bottom of said frame and being secured thereto;
   said center section including a plurality of portions extending the heighth of said frame and defining a plurality of separate compartments in said frame:
   individual quantities of beverage forming material received in said compartments, the beverage forming material being coffee that substantially fills the space between said filter layers, and said coffee is made of finely ground particles,
   a water by-pass being formed in said frame and it operatively extends from top to bottom thereof, which by-pass provides an added control for the rate of water flow through the container filter unit, which container and filter unit has at least substantially uniform water flow through properties at all areas thereof excluding said water by-pass.

2. A disposable individual beverage forming container and filter unit as in claim 1, wherein said frame has an inwardly extending flange at its lower edge, and the said filter layer on the bottom of said frame is secured to said flange and terminates radially inwardly of the periphery of said frame to avoid contact with a retainer for said unit to facilitate the sealing of said unit in the retainer.

3. A disposable individual beverage forming container and filter unit as in claim 2, where said frame is made from plastic, and said frame has an inwardly tapered surface at its bottom peripheral edge for sealing engagement with a positioner device for the filter unit when operatively positioned.

4. A disposable individual coffee container and filter comprising:
   a uniform heighth annular frame having a spider web-like center section;
   filter paper layers covering the top and bottom of said frame and center section being secured thereto;
   said spider web-like center section including a plurality of webs defining a plurality of areas in said annular frame;
   said filter paper layers and said areas combining to form a plurality of separate compartments: and individual quantities of coffee received in said compartments, said webs being of the height of said annular frame and said compartments being filled with uniform heighth layer of ultra fine coffee particles, all areas of the coffee container and filter having substantially uniform water flow through characteristics.

5. A disposable individual beverage forming container and filter unit as in claim 4, where substantially uniform thickness layers of coffee particles are present in said compartments and said coffee particles are retained as a substantially uniform thickness layer in transit and use.

6. A coffee making apparatus adapted to be positioned on and/or over a serving cup or other container and comprising:
   a receptacle having a base with an apertured center including a dependent flange having a spherically shaped inner surface portion, said flange connecting said apertured center to the remainder of said base; and
   a disposable individual coffee container and filter unit comprising:
   an annular vertically short uniform heighth frame having a partitioned center section;
   filter layers covering the top and bottom of said frame and secured thereto;
   ultra fine coffee bean particles received in said frame between said filter layers and filling separate partitioned areas in said frame and being a substantially uniform heighth; and
   said frame having a peripheral edge having a substantially frusto-spherical peripheral surfaced formed complementary to at least a portion of said inner surface of said flange of said receptacle whereby said coffee container and filter unit can be readily placed in said receptacle to seal against said flange.

7. A coffee making apparatus as in claim 6, where said seal between said flange and said coffee container and filter unit is broken by a by-pass recess formed between a portion of said flange and said peripheral edge surface of said frame, which by-pass provides for flow of water around said coffee container and filter unit.

8. A coffee making apparatus as in claim 6, where a lower corner peripheral edge section of said frame is that said portion formed complementary to said flange inner surface.

9. A coffee making apparatus as in claim 6, where said apertured center of said receptacle comprises spider-like partition means positioned at a lower portion of said flange, said coffee container and filter unit normally being positioned above said partition means when engaged with said flange but with said partition means limiting tilting of said coffee container and filter unit so as to maintain sealing engagement of said unit and flange.

10. A coffee making apparatus as in claim 6, where a lower corner peripheral edge section of said frame is formed complementary to a part of said spherical surface and engaged therewith, said coffee container and filter unit normally can be dropped into said receptacle to form a sealed engagement with said flange.

11. A coffee making apparatus adapted to be positioned on or over a serving cup or other container or positioned within a water heating device and comprising:
   a receptacle having a wall defining a bottom opening and;

a disposable individual coffee container and filter unit comprising:

an annular uniform heighth frame having a partitioned apertured center section, all portion of said center section extending the height of said frame;

filter layers covering the top and bottom of said frame and secured thereto;

ultra fine coffee particles received in said frame and filling space formed by said partitions in said frame between said filter layers as a substantially uniform layer, said coffee container and filter unit having at least substantially uniform water flow through characteristics at all equal areas thereof; and said frame having a periphery formed with a portion complementary to an inner surface portion of said bottom opening in said receptacle whereby said coffee container and filter unit can be readily placed in said receptacle, and be supported over said bottom opening in sealed engagement therewith.

12. A coffee making apparatus as in claim 11, where said coffee container and filter unit has at least one water by-pass opening formed therein and extending from top to bottom thereof, and said coffee particles are retained as a substantially uniform layer during transit and use.

13. A coffee making apparatus as in claim 11, where said coffee container and filter unit and said receptacle wall forming the said bottom opening form an assembly having a water by-pass opening provided therein.

* * * * *

UNITED STATES PATENT OFFICE
CERTIFICATE OF CORRECTION

Patent No. 4,446,158　　　　　　　　Dated May 1, 1984

Inventor(s) Philip H. English and Anthony D. Szpak

It is certified that error appears in the above-identified patent and that said Letters Patent are hereby corrected as shown below:

In Column 3, Line 13, delete the word "and" and substitute --.-- .

In Column 7, line 63, insert --and-- before the word "being".

In Column 8, line 33, change "surfaced" to --surface--.

In Column 9, line 4, change "portion" to --portions--.

Signed and Sealed this

Seventeenth Day of December 1985

[SEAL]

Attest:

DONALD J. QUIGG

Attesting Officer　　Commissioner of Patents and Trademarks